United States Patent [19]
Osato

[11] Patent Number: 5,521,006
[45] Date of Patent: May 28, 1996

[54] MAGNETO-OPTICAL RECORDING MEDIUM

[75] Inventor: Yoichi Osato, Yokohama, Japan

[73] Assignee: Canon Kabushiki Kaisha, Tokyo, Japan

[21] Appl. No.: 142,134

[22] Filed: Oct. 28, 1993

[30] Foreign Application Priority Data

Oct. 29, 1992 [JP] Japan .................................. 4-291183

[51] Int. Cl.$^6$ ................................. B32B 5/16; G11B 5/66
[52] U.S. Cl. .................. 428/332; 428/336; 428/694 ML; 428/694 DE; 428/694 XS; 428/694 NF; 428/694 RL; 428/694 MM; 428/670; 428/675; 428/900
[58] Field of Search ...................... 428/694 ML, 694 DE, 428/694 XS, 694 NF, 694 RL, 900, 332, 336, 670, 675, 694 MM

[56] References Cited

U.S. PATENT DOCUMENTS

| | | | |
|---|---|---|---|
| 3,472,575 | 10/1969 | Hunt | 350/151 |
| 4,587,176 | 5/1986 | Carcia | 428/611 |
| 4,675,767 | 6/1987 | Osato et al. | 360/131 |
| 4,950,547 | 8/1990 | Maeno et al. | 428/694 |
| 5,132,945 | 7/1992 | Osato et al. | 369/13 |

FOREIGN PATENT DOCUMENTS

| | | |
|---|---|---|
| 0304873 | 3/1989 | European Pat. Off. . |
| 0529795 | 3/1993 | European Pat. Off. . |
| 54056 | 3/1984 | Japan . |
| 133558 | 7/1985 | Japan . |
| 34747 | 2/1986 | Japan . |
| 211142 | 9/1988 | Japan . |
| 76551 | 3/1989 | Japan . |
| 1-169757 | 7/1989 | Japan . |
| 3-120643 | 5/1991 | Japan . |
| 3-228239 | 10/1991 | Japan . |
| 5-174436 | 7/1993 | Japan . |
| 5-182262 | 7/1993 | Japan . |
| 2164061 | 3/1986 | United Kingdom . |
| WO91/14263 | 9/1991 | WIPO . |

OTHER PUBLICATIONS

"Multilayered Pt/Co Magnetooptical Disk", S. Sumi, et al., *IEEE Translation Journal on Magnetics in Japan*, vol. 6, No. 2, Feb. 1991, pp. 141–151.

"Structure and recording properties of Pt/Co magneto-optical disks with various underlayers", S. Sumi, et al., *Journal of Magnetism and Magnetic Materials*, vol. 126, Nos. 1–3, Sep. 1993, pp. 590–592.

Patent Abstracts of Japan, vol. 13, No. 440 (P–940) Oct. 4, 1989.

Patent Abstracts of Japan, vol. 15, No. 331 (P–1241) Aug. 22, 1991.

Patent Abstracts of Japan, vol. 16, No. 5 (P–1295) Jan. 8, 1992.

Patent Abstracts of Japan, vol. 17, No. 596 (P–1636) Oct. 29, 1993.

Patent Abstracts of Japan, vol. 17, No. 605 (P–1639) Nov. 8, 1993.

*Primary Examiner*—Leszek Kiliman
*Attorney, Agent, or Firm*—Fitzpatrick, Cella, Harper & Scinto

[57] ABSTRACT

A magneto-optical recording medium includes a substrate, a perpendicular magnetic recording layer provided on the substrate and being a multilayered film formed by alternately laminating two or more combinations of Co layer and Pt layer, and a ground layer provided between the substrate and the recording layer. The ground layer is made of a material selected from the group consisting of composite oxides containing Y, Ba and Cu, TiC, $Nb_2O_5$, Si, intermetallic compounds between Si and a metal, SiC, $SrTiO_3$ and $CeO_2$.

18 Claims, 1 Drawing Sheet

FIG. 1

MAGNETO-OPTICAL RECORDING MEDIUM

BACKGROUND OF THE INVENTION

1. Field of the Invention

The present invention relates to a magneto-optical recording medium for recording and reproducing information with a laser beam, utilizing the magneto-optical effect, and more particularly to a magneto-optical recording medium having a recording layer of Co/Pt multilayered film.

2. Related Background Art

A magneto-optical recording medium for record and reproduction of information with light from a semiconductor laser is recently drawing attention and is put to practical use as a medium enabling a rewritable and high-density recording method. Mainly used as a recording material for the magneto-optical recording medium is an amorphous alloy between rare earth elements such as Gd, Tb, Dy, Nd and so on, and transition metal elements such as Fe, Co, Ni, and so on. The rare earth elements and the iron-group elements are, however, very oxidizable and liable to corrode.

Meanwhile, there is a magneto-optical recording medium excellent in corrosion resistance and in magneto-optical effect, in which a recording layer is a multilayered film obtained by laminating Co layers and Pt layers, for example as disclosed in U.S. Pat. No. 4,587,176 or in EP-A-304873. The magneto-optical recording medium with Co/Pt multilayered film is excellent especially in magneto-optical effect in the short wavelength region including blue and green, which are indispensable for improvement in recording density.

However, further improvements in coercive force and in perpendicular magnetic anisotropy have been required in order to put the magneto-optical recording medium with recording layer of Co/Pt multilayered film into practical use.

SUMMARY OF THE INVENTION

It is an object of the present invention to provide a magneto-optical recording medium improved in coercive force and in perpendicular magnetic anisotropy for the perpendicular magnetic recording layer, which is a Co/Pt multilayered film.

A magneto-optical recording medium, achieving the above object of the present invention, comprises:

a substrate;

a perpendicular magnetic recording layer provided on said substrate, said perpendicular magnetic recording layer being a multilayered film formed by alternately laminating two or more combinations of Co layer and Pt layer; and a ground layer provided between said substrate and said recording layer, said ground layer being made of a material selected from the group consisting of composite oxides containing Y, Ba and Cu, TiC, $Nb_2O_5$, Si, intermetallic compounds between Si and a metal, SiC, $SrTiO_3$ and $CeO_2$.

DESCRIPTION ON OF THE PREFERRED EMBODIMENTS

A magneto-optical recording medium according to the present invention has Co layers and Pt layers. The thickness of each layer and the number of layers are respectively determined to optimize magneto-optical characteristics and recording characteristics of the medium. If a Co layer has a thickness out of the range of from 2 to 10 Å or if a Pt layer has a thickness out of the range of from 5 to 30 Å, the perpendicular magnetic anisotropy is weakened so as to increase the record noise, which cannot be accepted for use as the magneto-optical recording medium. The thickness of recording layer is preferably within the range of from 50 to 500 Å. If the thickness of recording layer is less than 50 Å, the magneto-optical effect is insufficient; if it is more than 500 Å, the perpendicular magnetic anisotropy is degraded not to allow satisfactory recording.

An interface between two metal layers in the multilayered film constituting the recording layer is ideally formed in the so-called superlattice structure, which is to be flat with different metal atoms not intermixing. Alternatively, the interface may be formed in the so-called composition change structure, in which the composition thereof changes at a constant cycle as a whole even with a slight perturbation. Such a multilayered film can be formed by sputtering, vacuum evaporation or molecular-beam epitaxy. Further, at least one element selected from the group consisting of elements of Al, Si, Ti, V, Cr, Mn, Fe, Ni, Cu, Zn, Ga, Ge, Zr, Nb, Mo, Ru, Rh, Ag, In, Sn, Sb, Hf, Ta, W, Re, Os, Ir, Au, Pb and Bi, may be optionally added to the multilayered film in order to improve the thermal stability and to lower the Curie temperature.

Figure 1:
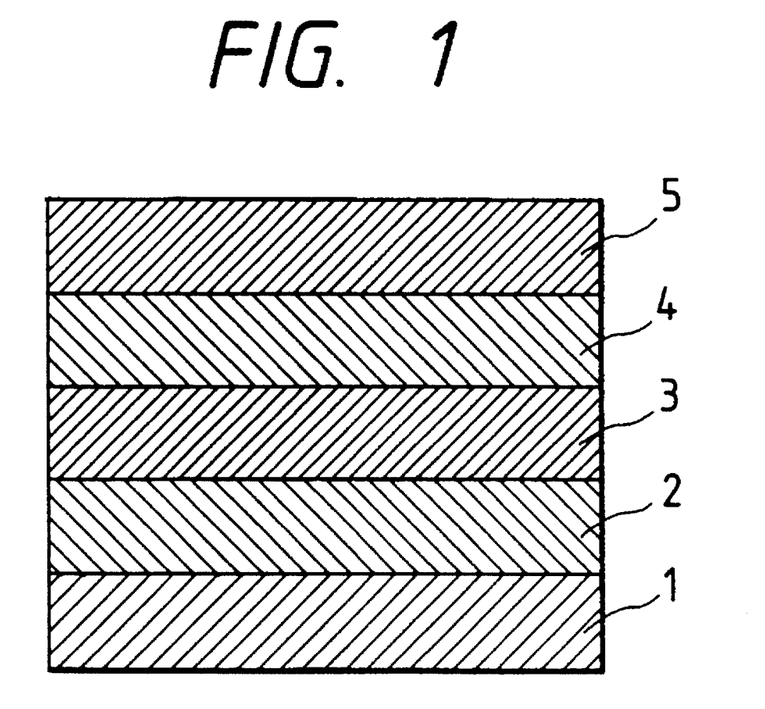
FIG. 1 is a schematic cross section to show an embodiment of magneto-optical recording medium according to the present invention.

To obtain the magneto-optical recording medium according to the present invention, prior to the formation of the recording layer as described above, a ground layer as described hereinafter is first formed on a substrate made of a glass or plastic material. The recording layer is then formed on this ground layer. FIG. 1 shows a schematic cross section of an embodiment of a magneto-optical recording medium according to the present invention. In the magneto-optical recording medium the recording layer 3 is formed on the ground layer 2 above the substrate 1. Further, a protection layer 4 made of a dielectric may be provided in order to protect the recording layer 3 and to improve the magneto-optical characteristics. In addition, a metal layer 5 may be further added as a heat sink layer on the protection layer 4 in order to reduce the record noise and to improve the recording characteristics.

The material for protection layer 4 may be of the same kind as that for ground layer 2, or may be an oxide such as $Al_2O_3$, $Ta_2O_5$, MgO, $SiO_2$, $TiO_2$, $Fe_2O_3$, $ZrO_2$, $Bi_2O_3$, ZnO, $In_2O_3$, $CeO_2$, $SrTiO_3$, $BaTiO_3$, or $YBa_2Cu_3O_{7-x}$ ($0 \leq x \leq 1$), a nitride such as ZrN, TiN, $Si_3N_4$, AlN, BN, TaN, or NbN, a carbide such as TiC, WC, or SiC, or a sulfide such as ZnS or SnS. Further, the material for metal layer 5 may be Al, Au, Ag, Cu, Pt, Pd, etc.

The ground layer 2 is described in detail in the following.

In the magneto-optical recording medium of the present invention, the ground layer may be a layer including at least one of (1) composite oxide layer containing Y, Ba and Cu (as will be referred to as a YBCO layer), (2) TiC layer, (3) $Nb_2O_5$ layer, (4) Si layer, (5) intermetallic compound layer between Si and a metal, (6) SiC layer, (7) $SrTiO_3$ layer, and (8) $CeO_2$ layer. If the ground layer is formed as a lamination of plural layers, the either one of the (1) to (8) layers as described should be preferably arranged in contact with the recording layer 3.

The above (1) to (8) layers will be described one by one.

(1) composite oxide layer containing Y, Ba and Cu (YBCO layer)

YBCO is a composite crystal of oxides of Y, Ba and Cu, which is recently drawing attention as a material revealing superconductivity at a relatively high temperature. In the case that the YBCO layer is formed as the ground layer by the sputtering process, a YBCO sintered target used in the sputtering should preferably have the following composition:

$$YBa_2Cu_3O_{7-x}$$

where $0 \leq x \leq 1$. More preferably, $0.4 \leq x \leq 0.7$. In this case, the composition is $Y_1Ba_2Cu_3O_{6.4}$ to $Y_1Ba_2Cu_3O_{6.6}$ by atomic ratio.

If all oxygen atoms (O) are taken into the crystal, that is, if the composition is stoichiometrically expressed, it is $Y_1Ba_2Cu_3O_7$. The color of target is gray. Argon gas makes the sputter primary layer light brown. If the sputtering is carried out with a mixture gas of oxygen (i.e., if the film is intended to be formed as a film with stoichiometric composition), the color becomes almost transparent but the effect to improve the magnetic characteristics as the ground layer will be weakened. In contrast, if an oxygen loss is so great as to lower the number of oxygens in the formula down to below 6, the layer will be substantially a metal film, increasing absorption or reflection of light. Such a layer cannot be used as the ground layer.

If the YBCO layer is used as the ground layer, its thickness is selected in the range of from 50 to 5000 Å. A preferable range is approximately from 200 to 1800 Å. If the film thickness is thinner than 50 Å, the effect as the ground layer could be insufficient; if it is thicker than 5000 Å, the magneto-optical characteristics and the magnetic characteristics could be degraded.

(2) TiC layer

The TiC layer as the ground layer is formed for example by sputtering. If the TiC layer is used as the ground layer, its thickness is selected in the range of from 50 to 5000 Å. A preferable range is approximately from 200 to 800 Å. If the film thickness is thinner than 50 Å, the effect as the ground layer could be insufficient; if it is thicker than 5000 Å, the magneto-optical characteristics and the magnetic characteristics could be degraded.

(3) $Nb_2O_5$ layer

The $Nb_2O_5$ layer as the ground layer is formed for example by sputtering. If the $Nb_2O_5$ layer is used as the ground layer, its thickness is selected in the range of from 50 to 5000 Å. A preferable range is approximately from 600 to 1200 Å. If the film thickness is thinner than 50 Å, the effect as the ground layer could be insufficient; if it is thicker than 5000 Å, the magneto-optical characteristics and the magnetic characteristics could be degraded.

(4) Si layer

The Si layer as the ground layer is formed for example by sputtering. If the Si layer is used as the ground layer, its thickness is selected in the range of from 20 to 2000 Å. A preferable range is approximately from 100 to 1800 Å. In case that record and reproduction is performed with visible light, the thickness is preferably set for example to below 500 Å in order to avoid absorption of light by Si. If the film thickness is thinner than 20 Å, the effect as the ground layer could be insufficient; if it is thicker than 2000 Å, the magneto-optical characteristics and the magnetic characteristics could be degraded.

(5) Intermetallic compound layer between Si and metal

The intermetallic compound layer between Si and a metal as the ground layer is formed for example by sputtering. Such an intermetallic compound may be arbitrarily selected from various intermetallic compounds, for example from $TiSi_2$, $NbSi_2$, $CrSi_2$, $MoSi_2$ and $WSi_2$. If the intermetallic layer between Si and a metal is used as the ground layer, its thickness is selected in the range of from 20 to 2000 Å. If the film thickness is thinner than 20 Å, the effect as the ground layer could be insufficient; if it is thicker than 2000 Å, the magneto-optical characteristics and the magnetic characteristics could be degraded.

(6) SiC layer

The SiC layer as the ground layer is formed for example by sputtering. If the SiC layer is used as the ground layer, its thickness is selected in the range of from 50 to 5000 Å. A preferable range is approximately from 400 to 1800 Å. If the film thickness is thinner than 50 Å, the effect as the ground layer could be insufficient; if it is thicker than 5000 Å, the magneto-optical characteristics and the magnetic characteristics could be degraded.

(7) $SrTiO_3$ layer

The $SrTiO_3$ layer as the ground layer is formed for example by sputtering. If the $SrTiO_3$ layer is used as the ground layer, its thickness is selected in the range of from 50 to 5000 Å. A preferable range is approximately from 600 to 1200 Å. If the film thickness is thinner than 50 Å, the effect as the ground layer could be insufficient; if it is thicker than 5000 Å, the magneto-optical characteristics and the magnetic characteristics could be degraded.

(8) $CeO_2$ layer

The $CeO_2$ layer as the ground layer is formed for example by sputtering. If the $CeO_2$ layer is used as the ground layer, its thickness is selected in the range of from 50 to 5000 Å. A preferable range is approximately from 600 to 1200 Å. If the film thickness is thinner than 50 Å, the effect as the ground layer could be insufficient; if it is thicker than 5000 Å, the magneto-optical characteristics and the magnetic characteristics could be degraded.

Since the magneto-optical recording medium of the present invention includes no rare earth element in the recording layer, it is excellent in corrosion resistance. Further, since the recording layer is formed on the substrate through the ground layer with specific composition, the coercive force and the perpendicular magnetic anisotropy of the recording layer are improved. The improvement makes the bit shape sharper in recording so as to decrease the record noise.

Next described are more specific examples of the present invention.

EXAMPLE 1-1

A sputter apparatus was used with five sputter guns. A glass substrate was set on a water-cooled rotating table in the sputter apparatus. The rotating table was then rotated at speed of 50 rotations/minute. Magnetron sputtering was carried out under the condition of argon gas pressure of 1.0 Pa. With a first target of YBCO sintered target, a YBCO layer was formed as the ground layer in thickness of 700 Å on the glass substrate. Then Co and Pt are alternately deposited on the YBCO layer with a second Co target and with a third Pt target, respectively, by alternately opening and closing respective shutters therefor, whereby a Co/Pt multilayered film (recording layer) was formed. The multilayered film was constructed such that a first Pt layer was deposited in thickness of 10 Å and then that formation of Co layer in thickness of 3.5 Å and Pt layer in thickness of 15 Å was repeated to obtain a lamination of ten cycles of Co layers and Pt layers alternately built up (thus obtaining a multilayered film in total thickness of 195 Å). Then, using a fourth target, a protection layer of SiO was formed in thickness of 1000 Å.

Magnetic measurement was carried out for the sample of thus produced magneto-optical recording medium, using a vibrating sample magnetometer (VSM) and a torque meter. The measurement results are listed in Table 1. As shown in Table 1, the saturation magnetization was 300 emu/cm$^3$, the coercive force was 1.1 kOe, and the measured torque value per unit volume (perpendicular magnetic anisotropy constant without compensation of shape anisotropy) was 1.33× 10$^6$ erg/cm$^3$. It is noted that the perpendicular magnetic anisotropy will be expressed by a measured torque value per unit volume in the following tables.

EXAMPLES 1-2 to 1-12

Each sample was produced in the same manner as in Example 1-1 except that the material for ground layer was changed by changing the material for first target in the sputter system. Examples 1-2, 1-3, 1-10 to 1-12 each employ a sintered target. The materials for ground layer are within the scope of the present invention. The thus produced samples were subjected to the same magnetic measurement as in Example 1-1. The measurement results are shown in Table 1.

Comparative Example 1-1

A sample of magneto-optical recording medium was produced in the same manner as in Example 1-1 except that the multilayered film (recording layer) was formed directly on the glass substrate without ground layer. The same magnetic measurement as in Example 1-1 was carried out with the produced sample. The measurement results are shown in Table 1.

Comparative Examples 1-2 to 1-16

Each sample was produced in the same manner as in Example 1-1 except that the material for ground layer was changed by changing the material for first target in the sputter system. In the comparative examples, the materials for ground layer were conventionally well-known dielectrics. Some of the dielectrics have been often used as the ground layer in magneto-optical recording medium. The same magnetic measurement as in Example 1-1 was carried out with the thus produced samples. The measurement results are shown in Table 1.

TABLE 1

|   | Mater. for Grd Lyr (t = 700 Å) | Sat. Magnet. (emu/cm$^3$) | Coer. Force (kOe) | Perp. Mag. Anisotr. (erg/cm$^3$) |
|---|---|---|---|---|
| Examples | | | | |
| 1-1 | YBCO | 300 | 1.10 | 1.33 × 10$^6$ |
| 1-2 | TiC | 300 | 1.43 | 1.00 × 10$^6$ |
| 1-3 | Nb$_2$O$_5$ | 300 | 0.83 | 1.36 × 10$^6$ |
| 1-4 | Si | 300 | 0.90 | 1.13 × 10$^6$ |
| 1-5 | TiSi$_2$ | 305 | 0.98 | 1.45 × 10$^6$ |
| 1-6 | NbSi$_2$ | 300 | 0.93 | 1.30 × 10$^6$ |
| 1-7 | CrSi$_2$ | 295 | 0.77 | 1.15 × 10$^6$ |
| 1-8 | MoSi$_2$ | 290 | 0.73 | 1.28 × 10$^6$ |
| 1-9 | WSi$_2$ | 300 | 0.85 | 1.55 × 10$^6$ |
| 1-10 | SiC | 300 | 0.80 | 1.38 × 10$^6$ |

TABLE 1-continued

|   | Mater. for Grd Lyr (t = 700 Å) | Sat. Magnet. (emu/cm$^3$) | Coer. Force (kOe) | Perp. Mag. Anisotr. (erg/cm$^3$) |
|---|---|---|---|---|
| 1-11 | SrTiO$_3$ | 305 | 0.90 | 1.17 × 10$^6$ |
| 1-12 | CeO$_2$ | 300 | 0.91 | 1.35 × 10$^6$ |
| Comp. Examples | | | | |
| 1-1 | None (glass) | 300 | 0.58 | 9.06 × 10$^5$ |
| 1-2 | ZnS | 310 | 0.66 | 4.57 × 10$^5$ |
| 1-3 | AlN | 305 | 0.58 | 9.21 × 10$^5$ |
| 1-4 | SiO | 295 | 0.60 | 7.77 × 10$^5$ |
| 1-5 | Mullite | 305 | 0.65 | 6.93 × 10$^5$ |
| 1-6 | TiN | 310 | 0.96 | 1.23 × 10$^6$ |
| 1-7 | In$_2$O$_3$ + SnO$_2$ | 300 | 0.80 | 1.10 × 10$^6$ |
| 1-8 | Fe$_2$O$_3$ | 295 | 0.61 | 8.38 × 10$^5$ |
| 1-9 | TiO$_2$ | 305 | 0.70 | 1.15 × 10$^6$ |
| 1-10 | Si$_3$N$_4$ | 305 | 0.88 | 1.24 × 10$^6$ |
| 1-11 | ZnO | 300 | 1.06 | 8.05 × 10$^5$ |
| 1-12 | HfO$_2$ | 310 | 0.54 | 1.05 × 10$^6$ |
| 1-13 | Al$_2$O$_3$ | 300 | 0.61 | 1.07 × 10$^6$ |
| 1-14 | Ta$_2$O$_5$ | 305 | 0.65 | 1.04 × 10$^6$ |
| 1-15 | BaTiO$_3$ | 300 | 0.44 | 1.02 × 10$^6$ |
| 1-16 | WC | 305 | 0.65 | 1.03 × 10$^6$ |

As apparent from Table 1, the magneto-optical recording media of the present invention generally have higher values about the coercive force and the perpendicular magnetic anisotropy of recording layer, as compared with the magneto-optical recording media with conventional ground layer. Currently, Si$_3$N$_4$ is often used as the ground layer in magneto-optical recording medium having a recording layer of rare earth-transition metal alloy (for example TbFeCo). The magneto-optical recording media of the present invention show the same or higher level of coercive force and perpendicular magnetic anisotropy as compared with that using Si$_3$N$_4$. Although the ground layer has a single value of thickness of 700 Å in Examples 1-1 to 1-16, the film thickness of ground layer may be changed depending upon its material, whereby the coercive force and the perpendicular magnetic anisotropy can be further improved, as will be described later.

EXAMPLE 2-1

A sputter apparatus was used with five sputter guns. A polycarbonate substrate was set on a water-cooled rotating table in the sputter apparatus. The rotating table was then rotated at speed of 50 rotations/minute. Magnetron sputtering was carried out under the condition of argon gas pressure of 1.0 Pa. With a first target of YBCO sintered target, a YBCO layer was formed as the ground layer in thickness of 700 Å on the polycarbonate substrate. Then Co and Pt are alternately deposited on the YBCO layer with a second Co target and with a third Pt target, respectively, by alternately opening and closing respective shutters therefor, whereby a Co/Pt multilayered film (recording layer) was formed. The multilayered film was constructed such that a first Pt layer was deposited in thickness of 10 Å and then that formation of Co layer in thickness of 3.5 Å and Pt layer in thickness of 15 Å was repeated to obtain a lamination of ten cycles of Co layers and Pt layers alternately built up (thus obtaining a multilayered film in total thickness of 195 Å). Then a protection layer of YBCO was formed in thickness of 400 Å with the first target. Further, Al was deposited thereon in thickness of 500 Å with the fourth target to obtain a metal layer (heat sink layer). The disk sample of thus produced magneto-optical recording medium was evaluated in recording characteristics, as described below.

The sample disk was set in a record and reproduction evaluation apparatus (DDU 1000 manufactured by PULSTEC INDUSTRIAL CO., LTD.). While the sample disk was rotated at linear velocity of 8.5 m/sec with an external bias magnetic field Hb of 300 Oe, a laser beam of wavelength 830 nm focused in about 1.2 μm was guided to irradiate the disk from the polycarbonate substrate side thereby to record information. The laser beam was modulated at duty ratio of 33% at frequency 4 MHz and the laser power was 7 mW. After that, the recorded information was reproduced with laser power of 1 mW to measure a C/N ratio (carrier-to-noise ratio) of reproduction signal. The measurement results are shown in Table 2. As shown in Table 2, the C/N ratio was 50 dB and the record noise was low.

EXAMPLES 2-2 to 2-6

Each sample was produced in the same manner as in Example 2-1 except that the material for ground layer and protection layer was changed by changing the material for first target. The target employed was a sintered target in each example. The materials for ground layer herein are within the scope of the present invention. The thus produced samples were evaluated in recording characteristics in the same manner as in Example 2-1. The evaluation results are shown in Table 2.

Comparative Examples 2-1 to 2-8

Each sample was produced in the same manner as in Example 2-1 except that the material for ground layer and protection layer was changed by changing the material for first target in the sputter system. In the comparative examples, the materials for ground layer and protection layer were conventionally well-known dielectrics. The thus produced samples were evaluated in recording characteristics in the same manner as in Example 2-1. The evaluation results are shown in Table 2.

TABLE 2

| | Mater. for G. Lyr & Prot. Lyr | C/N ratio (dB) | Comments |
|---|---|---|---|
| Examples | | | |
| 2-1 | YBCO | 50 | Low record noise |
| 2-2 | TiC | 47 | Low record noise |
| 2-3 | $Nb_2O_5$ | 50 | Low record noise |
| 2-4 | SiC | 49 | Low record noise |
| 2-5 | $SrTiO_3$ | 48 | Low record noise |
| 2-6 | $CeO_2$ | 49 | Low record noise |
| Comp. Examples | | | |
| 2-1 | ZnS | 28 | High record noise Low carrier |
| 2-2 | SiO | 35 | High record noise |
| 2-3 | $Fe_2O_3$ | 36 | High record noise |
| 2-4 | $TiO_2$ | 43 | |
| 2-5 | $Si_3N_4$ | 47 | Low record noise |
| 2-6 | ZnO | 36 | High record noise |
| 2-7 | $Ta_2O_5$ | 45 | |
| 2-8 | $BaTiO_3$ | 40 | High record noise |

Thickness of grd lyr: 700 Å; Thickness of prot. lyr: 400 Å

As apparent from Table 2, the samples employing the ground layer of YBCO layer or $Nb_2O_5$ layer had the maximum C/N ratio. Among them, the sample employing the YBCO layer shows the high coercive force and perpendicular magnetic anisotropy, as shown in Table 1. Even if the ground layer is other than the YBCO layer and the $Nb_2O_5$ layer, the magneto-optical recording media according to the present invention show the same or higher C/N ratio as compared with the comparative example with $Si_3N_4$ having the highest C/N ratio in the comparative examples. Comparing with Table 1, it is seen that a sample with perpendicular magnetic anisotropy of recording layer lower than $1\times10^6$ erg/cm$^3$ has high record noise. Further, if the perpendicular magnetic anisotropy is about $5\times10^5$ erg/cm$^3$, the carrier component of recording signals seems lowered. Also, unless the coercive force is kept at a certain level, the recording noise increases. For example, the sample with $BaTiO_3$ ground layer having a coercive force of 0.44 kOe increased the record noise in spite of the fact that the perpendicular magnetic anisotropy was more than $1\times10^6$ erg/cm$^3$.

EXAMPLE 3-1

A sputter apparatus was used with six sputter guns. A polycarbonate substrate was set on a water-cooled rotating table in the sputter apparatus. The rotating table was then rotated at speed of 50 rotations/minute. Magnetron sputtering was carried out under the condition of argon gas pressure of 1.0 Pa. With a first target of Si target, a Si layer was formed as the ground layer in thickness of 700 Å on the polycarbonate substrate. Then Co and Pt are alternately deposited on the Si layer with a second Co target and with a third Pt target, respectively, by alternately opening and closing respective shutters therefor, whereby a Co/Pt multilayered film (recording layer) was formed. The multilayered film was constructed such that a first Pt layer was deposited in thickness of 10 Å and then that formation of Co layer in thickness of 3.5 Å and Pt layer in thickness of 15 Å was repeated to obtain a lamination of ten cycles of Co layers and Pt layers alternately built up (thus obtaining a multilayered film in total thickness of 195 Å). Then a protection layer of SiC was formed in thickness of 400 Å with the fifth target. Further, Al was deposited thereon in thickness of 500 Å with the fourth target to obtain a metal layer (heat sink layer). The disk sample of thus produced magneto-optical recording medium was evaluated in recording characteristics, as described below.

The sample disk was set in a record and reproduction evaluation apparatus (DDU 1000 manufactured by PULSTEC INDUSTRIAL CO., LTD.). While the sample disk was rotated at linear velocity of 8.5 m/sec with an external bias magnetic field Hb of 300 Oe, a laser beam of wavelength 830 nm focused in about 1.2 μm was guided to irradiate the disk from the polycarbonate substrate side thereby to record information. The laser beam was modulated at duty ratio of 33% at frequency 4 MHz and the laser power was 7 mW. After that, the recorded information was reproduced with laser power of 1 mW to measure a C/N ratio (carrier-to-noise ratio) of reproduction signal. The measurement results are shown in Table 3. As shown in Table 3, the C/N ratio was 47 dB and the record noise was low.

EXAMPLES 3-2 AND 3-3

Each sample was produced in the same manner as in Example 3-1 except that the material for ground layer was changed by changing the material for first target. The materials for ground layer herein are within the scope of the present invention. The thus produced samples were evaluated in recording characteristics in the same manner as in Example 3-1. The evaluation results are shown in Table 3.

EXAMPLES 3-4 TO 3-6

Each sample was produced in the same manner as in Example 3-1 except that the ground layer was constructed by two layers of first layer and second layer. Namely, the ground layer was a lamination of a first layer in film thickness of 600 Å and a second layer in film thickness of 150 Å laminated in the named order from the polycarbonate substrate side, in which the first layer was deposited with the sixth target and the second layer with the first target. Various dielectrics which have conventionally been used were employed as the material for first layer, and various intermetallic compounds between Si and metal as the material for second layer. Then the thus produced samples were evaluated in recording characteristics in the same manner as in Example 3-1. The evaluation results are shown in Table 3.

Comparative Examples 3-1 to 3-8

Each sample was produced in the same manner as in Example 3-1 except that the material for ground layer was changed by changing the material for first target. Conventionally well-known dielectrics were used as the material for ground layer. The produced samples were subjected to the measurement of recording characteristics in the same manner as in Example 3-1. The measurement results are shown in Table 3.

TABLE 3

| | Mater. for G. Lyr (2nd Lyr & 1st Lyr) | C/N ratio (dB) | Comments |
|---|---|---|---|
| Examples | | | |
| 3-1 | Si | 47 | Low record noise |
| 3-2 | NbSi$_2$ | 45 | Low record noise |
| 3-3 | CrSi$_2$ | 45 | Low record noise |
| 3-4 | TiSi$_2$/Si$_3$N$_4$ | 50 | Low record noise |
| 3-5 | MoSi$_2$/Si$_3$N$_4$ | 50 | Low record noise |
| 3-6 | WSi$_2$/ZnO | 47 | Low record noise |
| Comp. Examples | | | |
| 3-1 | ZnS | 28 | High record noise Low carrier |
| 3-2 | SiO | 35 | High record noise |
| 3-3 | Fe$_2$O$_3$ | 36 | High record noise |
| 3-4 | TiO$_2$ | 43 | |
| 3-5 | Si$_3$N$_4$ | 47 | Low record noise |
| 3-6 | ZnO | 36 | High record noise |
| 3-7 | Ta$_2$O$_5$ | 45 | |
| 3-8 | BaTiO$_3$ | 40 | High record noise |

As apparent from Table 3, the magneto-optical recording media according to the present invention (Examples 3-1 to 3-6) showed good C/N ratios. Especially, the sample with the ground layer of a lamination of Si$_3$N$_4$ and Si-metal compound had the maximum C/N ratio. Comparing with Table 1, it is seen that the samples with perpendicular magnetic anisotropy of recording layer lower than $1\times10^6$ erg/cm$^3$ have high record noise. Further, if the perpendicular magnetic anisotropy is about $5\times10^5$ erg/cm$^3$, the carrier component of recording signals seems lowered. Also, unless the coercive force is at a certain level, the recording noise increases. For example, the BaTiO$_3$ ground layer with coercive force of 0.44 kOe increased the recording noise in spite of the fact that the perpendicular magnetic anisotropy was more than $1\times10^6$ erg/cm$^3$.

EXAMPLES 4-1 TO 4-9

Samples were produced in the same manner as in Example 1-1 except that the thickness of YBCO layer as the ground layer was changed. Then the magnetic measurement was carried out in the same manner as in Example 1-1. The measurement results are shown in Table 4.

TABLE 4

| | G Lyr YBOC Thick. (Å) | Sat. Mag. (emu/cm$^3$) | Coer. Force (kOe) | Perp. Mag. Anisotr. (erg/cm$^3$) |
|---|---|---|---|---|
| Examples | | | | |
| 4-1 | 50 | 300 | 0.60 | $9.0 \times 10^5$ |
| 4-2 | 100 | 300 | 0.65 | $9.5 \times 10^5$ |
| 4-3 | 200 | 300 | 0.70 | $1.15 \times 10^6$ |
| 4-4 | 400 | 295 | 0.80 | $1.20 \times 10^6$ |
| 4-5 | 600 | 310 | 0.98 | $1.30 \times 10^6$ |
| 4-6 | 800 | 305 | 1.07 | $1.30 \times 10^6$ |
| 4-7 | 1200 | 295 | 1.35 | $1.29 \times 10^6$ |
| 4-8 | 1800 | 300 | 1.42 | $1.20 \times 10^6$ |
| 4-9 | 2400 | 300 | 1.60 | $1.15 \times 10^6$ |

As seen from Table 4, with change in film thickness of YBCO layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1000 Å. From the values of coercive force and perpendicular magnetic anisotropy, the film thickness is preferably in the range of about 200 to 1800 Å when the YBCO layer is used as the ground layer.

EXAMPLES 5-1 TO 5-9

Samples were produced in the same manner as in Example 1-2 except that the thickness of TiC layer as the ground layer was changed. Then the magnetic measurement was carried out in the same manner as in Example 1-1. The measurement results are shown in Table 5.

TABLE 5

| | G. Lyr TiC Thick. (Å) | Sat. Mag. (emu/cm$^3$) | Coer. Force (kOe) | Perp. Mag. Anisotr. (erg/cm$^3$) |
|---|---|---|---|---|
| Examples | | | | |
| 5-1 | 50 | 305 | 0.62 | $8.5 \times 10^5$ |
| 5-2 | 100 | 310 | 0.70 | $9.0 \times 10^5$ |
| 5-3 | 200 | 310 | 0.87 | $9.6 \times 10^5$ |
| 5-4 | 400 | 290 | 1.00 | $1.00 \times 10^6$ |
| 5-5 | 600 | 305 | 1.24 | $1.10 \times 10^6$ |
| 5-6 | 800 | 300 | 1.45 | $1.05 \times 10^6$ |
| 5-7 | 1200 | 295 | 1.55 | $1.00 \times 10^6$ |
| 5-8 | 1800 | 300 | 1.75 | $9.0 \times 10^5$ |
| 5-9 | 2400 | 295 | 1.82 | $8.0 \times 10^5$ |

As seen from Table 5, with change in film thickness of TiC layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1000 Å. From the values of coercive force and perpendicular magnetic anisotropy, the film thickness is preferably in the range of approximately 200 to 800 Å when the TiC layer is used as the ground layer.

EXAMPLES 6-1 TO 6-6

The TiC layer is a semiconductor layer rather than a dielectric layer, which shows great light absorption in the visible light region. Therefore, in case that the visible light is used for record and reproduction, the maximum thickness of TiC layer usable as the ground layer is about 500 Å. It is thus conceivable that a lamination of transparent dielectric layer (first layer) and TiC layer is used as the ground layer.

Samples were produced in the same manner as in Example 2-2 except that the ground layer was constructed as a lamination of first layer and second layer. Namely, the ground layer was produced by laminating a first layer in film thickness of 600 Å and a second layer of TiC layer in film thickness of 250 Å in the named order from the polycarbonate substrate side, in which the first layer was deposited with the fifth target and the second layer with the first target. Various transparent dielectrics which have been conventionally used were used as the material for first layer. Then the thus produced samples were evaluated in recording characteristics in the same manner as in Example 2-1. The evaluation results are shown in Table 6.

TABLE 6

| | Mater. for G. Layer (2nd Lyr & 1st Lyr) | C/N ratio (dB) | Comments |
|---|---|---|---|
| Examples | | | |
| 6-1 | TiC/ZnS | 42 | |
| 6-2 | TiC/SiO | 45 | |
| 6-3 | TiC/$Fe_2O_3$ | 45 | |
| 6-4 | TiC/$TiO_2$ | 48 | Low record noise |
| 6-5 | TiC/$Si_3N_4$ | 51 | Low record noise |
| 6-6 | TiC/$Ta_2O_5$ | 50 | Low record noise |

Comparing the results in Table 6 with the results in Table 4, the samples in which a transparent dielectric layer is provided on the substrate and in which the TiC layer is provided between the transparent dielectric layer and the recording layer, whereby the ground layer is composed of the transparent dielectric layer and the TiC layer, reduce the recording noise thereby to obtain a good C/N ratio, as compared with the samples with ground layer only of transparent dielectric layer.

EXAMPLES 7-1 TO 7-9

Samples were produced in the same manner as in Example 1-3 except that the thickness of $Nb_2O_5$ layer as the ground layer was changed. Then the magnetic measurement was carried out in the same manner as in Example 1-1. The measurement results are shown in Table 7.

TABLE 7

| | G. Lyr $Nb_2O_5$ Thick. (Å) | Sat. Mag. (emu/$cm^3$) | Coer. Force (kOe) | Perp. Mag. Anisotr. (erg/$cm^3$) |
|---|---|---|---|---|
| Examples | | | | |
| 7-1 | 50 | 290 | 0.58 | $8.8 \times 10^5$ |
| 7-2 | 100 | 300 | 0.60 | $9.0 \times 10^5$ |
| 7-3 | 200 | 305 | 0.62 | $9.5 \times 10^5$ |

TABLE 7-continued

| | G. Lyr $Nb_2O_5$ Thick. (Å) | Sat. Mag. (emu/$cm^3$) | Coer. Force (kOe) | Perp. Mag. Anisotr. (erg/$cm^3$) |
|---|---|---|---|---|
| 7-4 | 400 | 300 | 0.70 | $1.05 \times 10^6$ |
| 7-5 | 600 | 310 | 0.85 | $1.20 \times 10^6$ |
| 7-6 | 800 | 305 | 0.87 | $1.35 \times 10^6$ |
| 7-7 | 1200 | 295 | 1.05 | $1.33 \times 10^6$ |
| 7-8 | 1800 | 300 | 1.08 | $1.15 \times 10^6$ |
| 7-9 | 2400 | 295 | 1.18 | $1.05 \times 10^6$ |

As seen from Table 7, with change in film thickness of $Nb_2O_5$ layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1000 Å. From the values of coercive force and perpendicular magnetic anisotropy, the film thickness is preferably in the range of about 600 to 1200 Å when the $Nb_2O_5$ layer is used as the ground layer.

EXAMPLES 8-1 TO 8-9

Samples were produced in the same manner as in Example 1-4 except that the thickness of Si layer as the ground layer was changed. Then the magnetic measurement was carried out in the same manner as in Example 1-1. The measurement results are shown in Table 8.

TABLE 8

| | G. Lyr Si Thick. (Å) | Sat. Mag. (emu/$cm^3$) | Coer. Force (kOe) | Perp. Mag. Anisotr. (erg/$cm^3$) |
|---|---|---|---|---|
| Examples | | | | |
| 8-1 | 50 | 300 | 0.61 | $9.2 \times 10^5$ |
| 8-2 | 100 | 300 | 0.70 | $1.05 \times 10^6$ |
| 8-3 | 200 | 310 | 0.75 | $1.12 \times 10^6$ |
| 8-4 | 400 | 295 | 0.82 | $1.15 \times 10^6$ |
| 8-5 | 600 | 305 | 0.89 | $1.15 \times 10^6$ |
| 8-6 | 800 | 305 | 0.92 | $1.18 \times 10^6$ |
| 8-7 | 1200 | 295 | 1.05 | $1.08 \times 10^6$ |
| 8-8 | 1800 | 305 | 1.10 | $1.00 \times 10^6$ |
| 8-9 | 2400 | 295 | 1.25 | $8.5 \times 10^5$ |

As seen from Table 8, with change in film thickness of Si layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1200 Å. From the values of coercive force and perpendicular magnetic anisotropy, the film thickness is preferably in the range of about 100 to 1800 Å when the Si layer is used as the ground layer. Also, since Si has great light absorption in the visible light wavelength region, the film thickness of not more than 500 Å for example suffices when it is used as the ground layer in the magneto-optical recording medium for such wavelength region.

EXAMPLES 9-1 TO 9-10

Samples were produced in the same manner as in Examples 1-5 to 1-9 except that the thickness of ground layer was changed from those in Examples 1-5 to 1-9. Then the magnetic measurement was carried out in the same manner as in Example 1-1. The measurement results are shown in Table 9.

Comparative Examples 4-1 to 4-4

Samples were produced in the same manner as in Comparative Examples 1-2, 1-15, 1-11, 1-4 with ground layer of ZnS, BaTiO$_3$, ZnO, or SiO, respectively, except that the film thickness was changed to 200 Å. Then the magnetic measurement was carried out in the same manner as in Example 1-1. The measurement results are shown in Table 9.

TABLE 9

| | Matr. for G. Lyr | Thick. (Å) | Sat. Mag. (emu/cm$^3$) | Coer. Force (kOe) | Perp. Mag. Anisotr. (erg/cm$^3$) |
|---|---|---|---|---|---|
| Examples | | | | | |
| 9-1 | TiSi$_2$ | 100 | 300 | 0.72 | 1.25 × 10$^6$ |
| 9-2 | TiSi$_2$ | 200 | 300 | 0.85 | 1.35 × 10$^6$ |
| 9-3 | NbSi$_2$ | 100 | 305 | 0.70 | 1.20 × 10$^6$ |
| 9-4 | NbSi$_2$ | 200 | 310 | 0.78 | 1.30 × 10$^6$ |
| 9-5 | CrSi$_2$ | 100 | 295 | 0.61 | 1.00 × 10$^6$ |
| 9-6 | CrSi$_2$ | 200 | 300 | 0.69 | 1.17 × 10$^6$ |
| 9-7 | MoSi$_2$ | 100 | 305 | 0.65 | 1.08 × 10$^6$ |
| 9-8 | MoSi$_2$ | 200 | 300 | 0.69 | 1.20 × 10$^6$ |
| 9-9 | WSi$_2$ | 100 | 300 | 0.67 | 1.12 × 10$^6$ |
| 9-10 | WSi$_2$ | 200 | 305 | 0.77 | 1.31 × 10$^6$ |
| Comp. Examples | | | | | |
| 4-1 | ZnS | 200 | 310 | 0.59 | 6.10 × 10$^5$ |
| 4-2 | BaTiO$_3$ | 200 | 300 | 0.60 | 8.45 × 10$^5$ |
| 4-3 | ZnO | 200 | 295 | 0.60 | 8.50 × 10$^5$ |
| 4-4 | SiO | 200 | 300 | 0.59 | 8.05 × 10$^5$ |

It is seen from Table 9 that when the intermetallic compounds between Si and metal are used as the ground layer, the improvement in magnetic characteristics is great even with film thickness of about 100 to 200 Å, different from the conventional materials for ground layer. If the light absorption is too great to form in a certain thickness the ground layer made of an intermetallic compound, a lamination of a transparent ground material and the intermetallic compound layer can be used.

EXAMPLES 10-1 TO 10-9

Samples were produced in the same manner as in Example 1-10 except that the thickness of SiC layer as the ground layer was changed. Then the magnetic measurement was carried out in the same manner as in Example 1-1. The measurement results are shown in Table 10.

TABLE 10

| | G. Lyr SiC Thick. (Å) | Sat. Mag. (emu/cm$^3$) | Coer. Force (kOe) | Perp. Mag. Anisotr. (erg/cm$^3$) |
|---|---|---|---|---|
| Examples | | | | |
| 10-1 | 50 | 300 | 0.58 | 8.9 × 10$^5$ |
| 10-2 | 100 | 300 | 0.65 | 9.7 × 10$^5$ |
| 10-3 | 200 | 310 | 0.67 | 1.12 × 10$^6$ |
| 10-4 | 400 | 295 | 0.75 | 1.15 × 10$^6$ |
| 10-5 | 600 | 305 | 0.81 | 1.30 × 10$^6$ |
| 10-6 | 800 | 305 | 0.87 | 1.40 × 10$^6$ |
| 10-7 | 1200 | 295 | 0.95 | 1.41 × 10$^6$ |
| 10-8 | 1800 | 305 | 1.00 | 1.25 × 10$^6$ |
| 10-9 | 2400 | 295 | 1.10 | 1.15 × 10$^6$ |

As seen from Table 10, with change in film thickness of SiC layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1000 Å. It is seen from the values of coercive force and perpendicular magnetic anisotropy that the film thickness is preferably in the range of about 400 to 1800 Å when the SiC layer is used as the ground layer.

EXAMPLES 11-1 TO 11-9

Samples were produced in the same manner as in Example 1-11 except that the thickness of SrTiO$_3$ layer as the ground layer was changed. Then the magnetic measurement was carried out in the same manner as in Example 1-1. The measurement results are shown in Table 11.

TABLE 11

| | G. Lyr SrTiO$_3$ Thick. (Å) | Sat. Mag. (emu/cm$^3$) | Coer. Force (kOe) | Perp. Mag. Anisotr. (erg/cm$^3$) |
|---|---|---|---|---|
| Examples | | | | |
| 11-1 | 50 | 290 | 0.58 | 8.9 × 10$^5$ |
| 11-2 | 100 | 305 | 0.65 | 9.0 × 10$^5$ |
| 11-3 | 200 | 300 | 0.70 | 9.5 × 10$^5$ |
| 11-4 | 400 | 300 | 0.80 | 1.00 × 10$^6$ |
| 11-5 | 600 | 310 | 0.86 | 1.10 × 10$^6$ |
| 11-6 | 800 | 300 | 0.95 | 1.15 × 10$^6$ |
| 11-7 | 1200 | 295 | 1.15 | 1.10 × 10$^6$ |
| 11-8 | 1800 | 300 | 1.25 | 1.00 × 10$^6$ |
| 11-9 | 2400 | 295 | 1.40 | 9.5 × 10$^5$ |

As seen from Table 11, with change in film thickness of SrTiO$_3$ layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1000 Å. It is seen from the values of coercive force and perpendicular magnetic anisotropy that the film thickness is preferably in the range of about 600 to 1200 Å when the SrTiO$_3$ layer is used as the ground layer.

EXAMPLES 12-1 TO 12-9

Samples were produced in the same manner as in Example 1-12 except that the thickness of CeO$_2$ layer as the ground layer was changed. Then the magnetic measurement was carried out in the same manner as in Example 1-1. The measurement results are shown in Table 12.

TABLE 12

| | G. Lyr CeO$_2$ Thick. (Å) | Sat. Mag. (emu/cm$^3$) | Coer. Force (kOe) | Perp. Mag. Anisotr. (erg/cm$^3$) |
|---|---|---|---|---|
| Examples | | | | |
| 12-1 | 50 | 300 | 0.58 | 8.8 × 10$^5$ |
| 12-2 | 100 | 305 | 0.60 | 9.0 × 10$^5$ |
| 12-3 | 200 | 305 | 0.65 | 9.3 × 10$^5$ |
| 12-4 | 400 | 290 | 0.75 | 1.15 × 10$^6$ |
| 12-5 | 600 | 300 | 0.85 | 1.22 × 10$^6$ |
| 12-6 | 800 | 300 | 0.92 | 1.33 × 10$^6$ |
| 12-7 | 1200 | 295 | 1.00 | 1.30 × 10$^6$ |
| 12-8 | 1800 | 290 | 1.08 | 1.17 × 10$^6$ |
| 12-9 | 2400 | 290 | 1.15 | 1.05 × 10$^6$ |

As seen from Table 12, with change in film thickness of CeO$_2$ layer as the ground layer, the coercive force or the perpendicular magnetic anisotropy of Co/Pt layer provided thereon changes. The coercive force increases as the film thickness increases. The perpendicular magnetic anisotropy slightly drops when the film thickness exceeds 1000 Å. It is seen from the values of coercive force and perpendicular magnetic anisotropy that the film thickness is preferably in the range of about 600 to 1200 Å when the CeO$_2$ layer is used as the ground layer.

As described above, the present invention provides a magneto-optical recording medium with a recording layer of Co/Pt multilayered film, in which the recording layer is formed on the substrate through the ground layer of specific composition, whereby the coercive force and the perpendicular magnetic anisotropy of the recording layer can be enhanced to make the bit shape sharper in recording so as to decrease the recording noise.

There are various applications of the present invention in addition to the embodiments as described above. The present invention involves all applications and embodiments not departing from the scope of the appended claims.

What is claimed is:

1. A magneto-optical recording medium comprising:
   a substrate;
   a perpendicular magnetic recording layer provided on said substrate, said perpendicular magnetic recording layer comprising alternating layers of Co and Pt; and
   a ground layer provided between said substrate and said recording layer, said ground layer being made of a material selected from the group consisting of (a) composite oxides containing Y, Ba and Cu; (b) TiC; (c) Nb$_2$O$_5$; (d) Si; (e) intermetallic compounds between Si and a metal; (f) SiC; (g) SrTiO$_3$; and (h) CeO$_2$, said ground layer having a thickness of 50 to 5000 Å for materials from groups (a), (b), (c), (f), (g), and (h), and a thickness of 20 to 2000 Å for materials from groups (d) and (e).

2. A magneto-optical recording medium according to claim 1, wherein said ground layer s made of a composite oxide having the following composition:

$$YBa_2Cu_3O_{7-x},$$

where $0 \leq x \leq 1$.

3. A magneto-optical recording medium according to claim 1, wherein said ground layer is made of an intermetallic compound selected from the group consisting of TiSi$_2$, NbSi$_2$, CrSi$_2$, MoSi$_2$ and WSi$_2$.

4. A magneto-optical recording medium according to claim 1, wherein said ground layer is made of a composite oxide containing Y, Ba and Cu and has a thickness in the range of from 200 to 1800 Å.

5. A magneto-optical recording medium according to claim 1, wherein said ground layer is made of TiC and has a thickness in the range of from 200 to 800 Å.

6. A magneto-optical recording medium according to claim 1, wherein said ground layer is made of Nb$_2$O$_5$ and has a thickness in the range of from 600 to 1200 Å.

7. A magneto-optical recording medium according to claim 1, wherein said ground layer is made of Si and has a thickness in the range of from 100 to 1800 Å.

8. A magneto-optical recording medium according to claim 1, wherein said ground layer is made of SiC and has a thickness in the range of from 400 to 1800 Å.

9. A magneto-optical recording medium according to claim 1, wherein said ground layer is made of SrTiO$_3$ and has a thickness in the range of from 600 to 1200 Å.

10. A magneto-optical recording medium according to claim 1, wherein said ground layer is made of CeO$_2$ and has a thickness in the range of from 600 to 1200 Å.

11. A magneto-optical recording medium according to claim 1, wherein said ground layer is formed in contact with said recording layer and wherein an additional ground layer is further provided between said substrate and said ground layer, said additional ground layer being made of a material selected from the group consisting of ZnS, SiO, Fe$_2$O$_3$, TiO$_2$, Si$_3$N$_4$, and Ta$_2$O$_5$.

12. A magneto-optical recording medium according to claim 1, wherein said each Co layer has a thickness in the range of from 2 to 10 Å and said each Pt layer has a thickness in the range of from 5 to 30 Å.

13. A magneto-optical recording medium according to claim 1, wherein added into said recording layer is at least one element selected from the group consisting of Al, Si, Ti, V, Cr, Mn, Fe, Ni, Cu, Zn, Ga, Ge, Zr, Nb, Mo, Ru, Ag, In, Sn, Sb, Hf, Ta, W, Re, Os, Ir, AU, Pb and Bi.

14. A magneto-optical recording medium according to claim 1, further comprising a protection layer provided on said recording layer.

15. A magneto-optical recording medium according to claim 2, wherein the following condition is satisfied: where $0.4 \leq x \leq 0.7$.

16. A magneto-optical recording medium according to claim 12, wherein said recording layer has a total thickness in the range of from 50 to 500 Å.

17. A magneto-optical recording medium according to claim 14, wherein said protection layer is made of a material selected from the group consisting of Al$_2$O$_3$, Ta$_2$O$_5$, MgO, SiO$_2$, TiO$_2$, Fe$_2$O$_3$, ZrO$_2$, Bi$_2$O$_3$, ZnO, In$_2$O$_3$, CeO$_2$, SrTiO$_3$, BaTiO$_3$, YBa$_2$Cu$_3$O$_{7-x}$ ($0 \leq x \leq 1$), ZrN, TiN, Si$_3$N$_4$, AlN, BN, TaN, NbN, TiC, WC, SiC, ZnS and SnS.

18. A magneto-optical recording medium according to claim 14, further comprising a metal layer provided on said protection layer, said metal layer being made of a metal selected from the group constituting of Al, Au, Ag, Cu, Pt and Pd.

* * * * *

UNITED STATES PATENT AND TRADEMARK OFFICE
CERTIFICATE OF CORRECTION

PATENT NO. : 5,521,006
DATED : May 28, 1996
INVENTOR(S) : YOICHI OSATO

It is certified that error appears in the above-indentified patent and that said Letters Patent is hereby corrected as shown below:

COLUMN 1

Line 66, "of" should read --of a--.

COLUMN 3

Line 14, "$0 \leq x1.$" should read --$0 \leq x \leq 1.$--; and
Line 59, "In" should read --In the --.

COLUMN 4

Line 55, "at" should read --at a--.

COLUMN 5

Line 47, "in" should read --in a--.

COLUMN 6

Line 10, "$9.06 \times 105$" should read --$9.06 \times 10^5$--;
Line 30, "in" should read --in a--; and
Line 49, "at" should read --at a--.

COLUMN 7

Line 11, "at" (first occurrence) should read --at a--; and
Line 14, "of" should read --of the--.

UNITED STATES PATENT AND TRADEMARK OFFICE
CERTIFICATE OF CORRECTION

PATENT NO. : 5,521,006    Page 2 of 2
DATED      : May 28, 1996
INVENTOR(S) : YOICHI OSATO It is certified that error appears in the above-indentified patent and that said Letters Patent is hereby corrected as shown below:

COLUMN 8

Line 24, "at" should read --at a--; and
Line 53, "at" (first occurrence) should read --at a--.

COLUMN 11

Line 7, "in case" should read --in the case--; and
Line 47, "with" (second occurrence) should read --with a--.

COLUMN 15

Line 57, "layer s" should read --layer is--.

COLUMN 16

Line 40, "AU" should read --Au--; and
Line 46, "where" should be deleted.

Signed and Sealed this

Twenty-ninth Day of October 1996

BRUCE LEHMAN

*Attest:*

*Attesting Officer*    *Commissioner of Patents and Trademarks*